Patented June 23, 1936

2,045,477

UNITED STATES PATENT OFFICE 2,045,477

LEUCO VAT DYESTUFF PASTE FOR PRINTING CLOTH

Carl Krauss, Frankfort-on-the-Main-Fechenheim, and Alfred Hagenböcker, Frankfort-on-the-Main-Hochst, Germany, assignors to General Aniline Works, Inc., New York, N. Y., a corporation of Delaware No Drawing. Application July 31, 1931, Serial No. 554,380. In Germany August 6, 1930

7 Claims. (Cl. 8—6)

The present invention relates to new leuco vat-dyestuff pastes for printing cloth.

We have found that vat dyestuff pastes especially suitable for printing cloth and possessing valuable properties are obtainable by mixing the stable leuco compounds of certain vat-dyestuffs of the thioindigoid series obtainable according to U. S. patent application Serial No. 441,720, filed April 4, 1930, in the name of Carl Krauss and Alfred Hagenböcker, for "New stable reduction compounds of the thioindigoid series and a process of preparing them" with ferrous sulfate or other heavy-metal salts. According to that application, stable leuco compounds are obtainable, for instance, by treating a thioindigoid dyestuff which is substituted by at least one substituent of the group consisting of halogen, alkyl and alkoxy, with a reducing agent in the presence of an alkali and thereupon, if necessary, treating the reaction mixture with an acid until the alkaline reaction to phenolphthalein paper has disappeared. In certain cases the stable leuco compounds are formed by treating the thioindigoid dyestuff with considerably smaller quantities of reducing agent and especially of an alkali than are commonly used in preparing a vat of the dyestuff in question, whereby the stable leuco compounds are obtainable directly without using any acid, i. e., they separate directly from the reaction mixture. In case it is necessary to use larger quantities of the reducing agent and of the alkali, the separation of the stable leuco compounds from the reaction mixture is advantageously completed as described above, by adding to the reaction mixture an acid until the alkaline reaction to phenolphthaleine paper has disappeared.

The stable leuco compounds used in accordance with the present invention are not identical with the normal leuco compounds of vat dyestuffs hitherto known. The stable leuco compounds are difficultly soluble in alkalies and are stable to air and oxygen, that is to say, the stable leuco compound does not oxidize by the mere influence of air whereas, as it is known, the normal, hitherto known leuco compounds are soluble in alkalies and re-oxidize under the influence of air to the dyestuffs proper. The stable leuco compound yields prints in the usual way but also with a considerably smaller quantity of a reducing agent than is required in the case of the dyestuff proper. The thioindigoid dyestuffs which are particularly suitable for the purpose of the present invention are those corresponding with the following general formula:

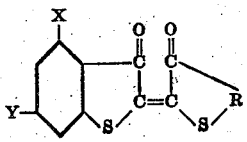

wherein X represents hydrogen or an alkyl group, Y represents halogen, and R stands for an aromatic nucleus bound in two adjacent positions, especially a benzene nucleus, which may be substituted, i. e. such symmetrical or assymmetrical dyestuffs of the thioindigoid series as have at least on one side a nucleus being substituted either in the 6-position by halogen or in the 4-position by alkyl and in the 6-position by halogen. Such dyestuffs are, for instance, 6.6'-dichloro-4.4'-dimethylthioindigo, 6.6'-dichlorthioindigo, 6.6'-dichloro-4'-methylthioindigo and 4.4'-dimethyl-6.5'.7'-trichlorthioindigo.

Instead of ferrous sulfate one can use other heavy-metal salts such as salts of zinc, or other iron salts. The oxides or hydroxides of the heavy-metals have a similar effect.

In order to obtain a homogenous paste which does not settle and to increase the printing capacity of the leuco vat-dyestuff paste, it is advisable in many cases to add glycerol, glycol, dihydroxydiethyl sulfide, dihydroxydiethylene oxide or another agent of like effect to the aqueous paste containing the heavy metal. To increase further the technical effect it is sometimes advisable to add the sodium salt of benzylsulfanilic acid or another hydrotropical agent of similar action.

The new leuco vat-dyestuff pastes are distinguished by their good capacity for being fixed, and for printing purposes they are very economical in use.

A similar effect can also be obtained with mixtures of leuco vat-dyestuffs in which the stable leuco compound of a dyestuff of the defined class constitutes a considerable proportion.

It is a surprising fact that in the new leuco-preparations the stable leuco compounds, even when stored for a prolonged time, are not materially re-oxidized into the corresponding vat-dyestuffs and that, even if a re-oxidation should occur in part, the preparations have still an appreciable industrial advantage over the preparations directly made from the vat dyestuffs.

The following examples serve to illustrate the invention but they are not intended to limit it thereto, the parts being by weight:

(1) 13 parts of the stable leuco compound of 6.6'-dichloro-4.4'-dimethylthioindigo, obtainable, for instance, according to Example 2 of the co-pending application Serial No. 441,720 filed on April 4, 1930, in the name of Carl Krauss and Alfred Hagenböcker, are mixed with about 2.4 parts of crystallized ferrous sulfate and made up with water to 100 parts. By addition of the iron salt both the ease with which the stable leuco compound can be fixed and the economy in its use, which without the addition are already considerable, are considerably enhanced.

A similar effect can be attained by adding ferrous sulfate to the stable leuco compound of 6.6'-dichlorothioindigo and 6.6'-dichloro-4'-methylthioindigo.

(2) 13 parts of the stable leuco compound of 6.6'-dichloro-4.4'-dimethylthioindigo as used in Example 1 are mixed with 2 to 2.4 parts of crystallized ferrous sulfate and 30 parts of commercial glycerol and the whole is made up with water to 100 parts. The mixture is distinguished by the ease with which it can be fixed and its economy in use when applied to printing purposes.

(3) In a manner similar to that of Examples 1 and 2, a considerable technical effect may be obtained in the case of a mechanical mixture of 6.6'-dichloro-4.4'-dimethylthioindigo and of 6.6'-diethoxythioindigo by adding to its stable leuco paste ferrous sulfate or another heavy metal salt and, if desired, any other of the substances mentioned above.

We claim:

1. As new compositions of matter, dyestuff pastes containing a compound of the group consisting of salts, oxides and hydroxides of iron, and zinc, and a stable leuco compound of a thioindigoid dyestuff of the following general formula:

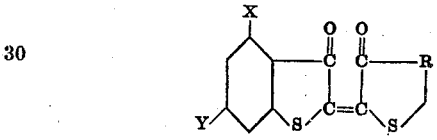

wherein X represents hydrogen or an alkyl group,
Y represents halogen and
R stands for an aromatic nucleus bound in two adjacent positions, said pastes being especially adapted for printing purposes, said stable leuco compound being stable to air and oxygen, difficultly soluble in alkali and yielding prints in the usual way but also with a considerably smaller quantity of a reducing agent than is required in the case of the dyestuff proper.

2. As new compositions of matter, dyestuff pastes containing a compound of the group consisting of salts, oxides and hydroxides of iron, and zinc, and a stable leuco compound of the dyestuff of the following constitution:

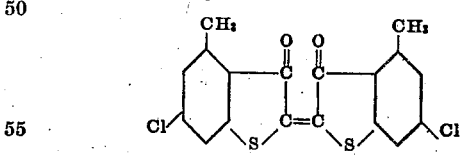

said pastes being especially adapted for printing purposes, said stable leuco compound being stable to air and oxygen, difficultly soluble in alkali and yielding prints in the usual way but also with a considerably smaller quantity of a reducing agent than is required in the case of the dyestuff proper.

3. As a new composition of matter, the dyestuff paste consisting of about 2.4 parts of crystallized ferrous sulfate, about 13 parts of the stable leuco compound of 6.6'-dichloro-4.4'-dimethylthioindigo and about 85 parts of water, said paste having a good capacity for being fixed and being very economical in use for printing purposes.

4. As a new composition of matter, the dyestuff paste consisting of about 2-2.4 parts of crystallized ferrous sulfate, about 30 parts of glycerol, about 13 parts of the stable leuco compound of 6.6'-dichloro-4.4'-dimethyl-thioindigo and about 55 parts of water, said paste having a good capacity for being fixed and being very economical in use for printing purposes, said stable leuco compound being stable to air and oxygen, difficultly soluble in alkali and yielding prints in the usual way but also with a considerably smaller quantity of a reducing agent than is required in the case of the dyestuff proper.

5. As new compositions of matter, dyestuff pastes containing a compound of the group consisting of salts, oxides and hydroxides of iron and zinc, and a stable leuco compound of a thioindigoid dyestuff of the following general formula:

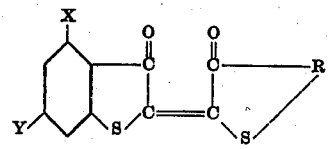

wherein X represents hydrogen or an alkyl group,
Y represents halogen and
R stands for a benzene nucleus bound in two adjacent positions, said pastes being especially adapted for printing purposes, said stable leuco compound being stable to air and oxygen, difficultly soluble in alkali and yielding prints in the usual way but also with a considerably smaller quantity of a reducing agent than is required in the case of the dyestuff proper.

6. As new compositions of matter, dyestuff pastes containing a compound of the group consisting of salts, oxides and hydroxides of iron and zinc, the sodium salt of benzyl-sulfanilic acid and a stable leuco compound of a thioindigoid dyestuff of the following general formula:

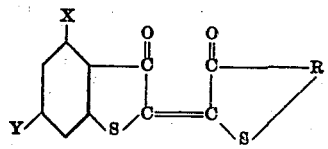

wherein X represents hydrogen or an alykyl group,
Y represents halogen and
R stands for a benzene nucleus bound in two adjacent positions, said pastes being especially adapted for printing purposes, said stable leuco compound being stable to air and oxygen, difficultly soluble in alkali and yielding prints in the usual way but also with a considerably smaller quantity of a reducing agent than is required in the case of the dyestuff proper.

7. As new compositions of matter, dyestuff pastes containing ferrous sulfate, the sodium salt of benzyl-sulfanilic acid and the stable leuco compound of 6.6'-dichloro-4.4'-dimethylthioindigo, said pastes being especially adapted for printing purposes, said stable leuco compound being stable to air and oxygen, difficultly soluble in alkali and yielding prints in the usual way but also with a considerably smaller quantity of a reducing agent than is required in the case of the dyestuff proper.

CARL KRAUSS.
ALFRED HAGENBÖCKER.